United States Patent [19]

Feist

[11] Patent Number: 4,942,002

[45] Date of Patent: Jul. 17, 1990

[54] PROCESS FOR CONVERTING CARBON BLANKS INTO GRAPHITE ELECTRODES

[76] Inventor: Horst J. Feist, Am Mühlgraben 7, D-6969 Hardheim, Fed. Rep. of Germany

[21] Appl. No.: 381,603

[22] Filed: Jul. 18, 1989

[30] Foreign Application Priority Data

Jul. 18, 1988 [DE] Fed. Rep. of Germany ....... 3824323

[51] Int. Cl.⁵ ............................................ C01B 31/04
[52] U.S. Cl. ..................... 264/27; 264/29.6; 264/29.7; 264/85; 264/105; 264/162; 264/294; 264/296; 264/297.9; 264/348; 264/DIG. 65; 423/448; 425/174.6; 425/445
[58] Field of Search ............... 264/27, 29.6, 29.7, 264/85, 105, 138, 161, 162, 237, 297.1, 297.8, 297.9, 348, DIG. 65, 294, 296; 425/174, 174.6, 445; 423/445, 448, 449

[56] References Cited

U.S. PATENT DOCUMENTS

| | | | |
|---|---|---|---|
| 1,456,495 | 5/1923 | Sieurin | 264/105 X |
| 1,884,600 | 10/1932 | Derby | 423/448 X |
| 2,983,022 | 5/1961 | Dressler et al. | 264/29.7 X |
| 3,009,863 | 11/1961 | Angevine | 264/29.7 |
| 4,015,068 | 3/1977 | Vohler | 423/448 X |

FOREIGN PATENT DOCUMENTS

| | | |
|---|---|---|
| 19232 | 10/1984 | Austria . |
| 311538 | 4/1989 | European Pat. Off. . |
| 2311467 | 9/1974 | Fed. Rep. of Germany . |
| 3601014 | 7/1987 | Fed. Rep. of Germany . |
| 3606380 | 9/1987 | Fed. Rep. of Germany . |
| 882920 | 11/1961 | United Kingdom ............... 264/29.6 |

Primary Examiner—Jeffery Thurlow
Assistant Examiner—Leo B. Tentoni
Attorney, Agent, or Firm—Peter K. Kontler

[57] ABSTRACT

Cylindrical carbon blanks are assembled into one or more upright stacks which are advanced stepwise in an upward direction in one or more upright tubes which insulate the column or columns from the surrounding atmosphere. The blanks in the upright tube or tubes are preheated by exchanging heat with an inert gas, such as pure argon, and the preheated blanks are thereupon conveyed along one or more horizontal path sections into the upper end of an additional tube wherein the blanks are heated to graphitizing temperature by a series of electrode pairs. The thus obtained graphite electrodes are cooled by inert gas which is thereupon admitted into the upright tube or tubes to preheat fresh carbon blanks.

29 Claims, 4 Drawing Sheets

FIG. 3
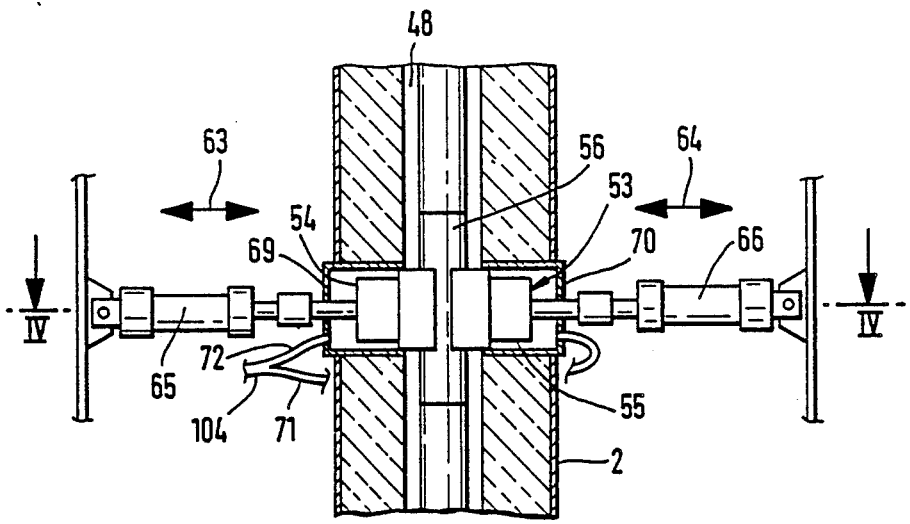
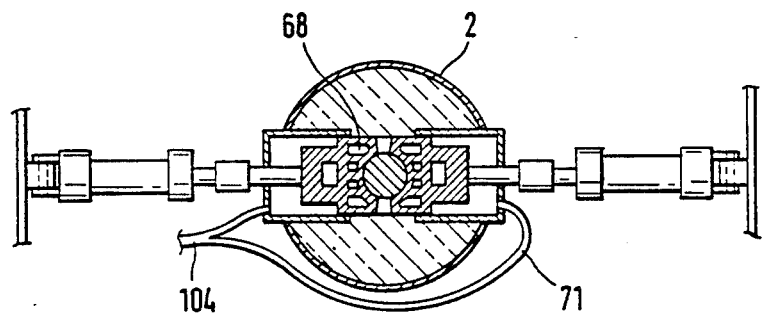
FIG. 4

PROCESS FOR CONVERTING CARBON BLANKS INTO GRAPHITE ELECTRODES

BACKGROUND OF THE INVENTION

The invention relates to a process for making graphite electrodes, and more particularly to a process for converting carbon blanks into graphite electrodes. Still more particularly, the invention relates to a process for graphitizing dimensionally stable carbon blanks.

It is known to convert dimensionally stable carbon blanks into graphite electrodes in an apparatus wherein carbon blanks of identical size and shape are stacked on top of each other and the resulting file or column is conveyed within an insulating jacket through a heating section wherein electric current is passed through the blanks to heat the blanks to graphite temperature. The thus heated blanks are thereupon cooled to complete their conversion into graphite electrodes.

German Pat. No. 23 11 467 discloses a process which includes the step of surrounding the carbon blanks in the heating section with particles of carbon black. A drawback of the patented process is that the particles of carbon black contaminate the apparatus and that expensive additional equipment is needed for introduction and confinement of such particles. Moreover, the heat energy which is used to heat the blanks is dissipated.

OBJECTS OF THE INVENTION

An object of the invention is to provide a simple, economical and efficient process for converting carbon blanks into graphite electrodes.

Another object of the invention is to provide a process which can be practiced in a relatively simple, compact and inexpensive apparatus.

A further object of the invention is to provide a process which can be practiced without resorting to particles of carbon black or other solid contaminants.

An additional object of the invention is to provide a novel and improved process for preheating, heating and cooling carbon blanks during conversion into graphite electrodes.

Still another object of the invention is to provide a process which ensures economical utilization of heat which is generated during conversion of carbon blanks into graphite electrodes.

A further object of the invention is to provide a novel and improved method of recovering heat which is generated during conversion of carbon blanks into graphite electrodes.

Another object of the invention is to provide a novel method of advancing carbon blanks during conversion into graphite electrodes.

An additional object of the invention is to provide a novel and improved method of preheating carbon blanks preparatory to heating to graphitizing temperatures.

SUMMARY OF THE INVENTION

The invention resides in the provision of a process for converting substantially identical dimensionally stable carbon blanks into graphite electrodes. The improved process comprises the steps of accumulating the blanks into at least one column wherein the blanks are disposed on top of each other; thermally insulating the blanks of the at least one column from the surrounding atmosphere, advancing the at least one column along a predetermined path (e.g., along a substantially inverted U-shaped path), preheating the blanks in a first portion of the path, heating the preheated blanks with electric current in a second portion of the path downstream of the first portion, cooling the blanks in a third portion of the path downstream of the second portion with attendant completion of conversion of blanks into electrodes, establishing a layer of inert gas (such as argon) around the at least one column of blanks in the path, withdrawing inert gas from the third portion of the path, and returning the withdrawn gas into the first portion of the path.

If the carbon blanks are cylindrical or substantially cylindrical blanks, the accumulating step preferably comprises placing the blanks-end-to-end so that the at least one column contains coaxial blanks.

The process can further comprise the steps of conveying the returned gas along the first portion of the path, and admitting the thus conveyed gas into the third portion of the path.

The accumulating step can comprise gathering carbon blanks into at least one substantially upright column.

The advancing step can include advancing the blanks in a first direction (e.g., upwardly) along the first portion of the path and in a different second direction (e.g., downwardly) along the second and third portions of the path. It will be seen that the second direction is or can be substantially counter to the first direction, that the blanks which advance along the first portion of the path can move from a lower level to a higher level, and that the blanks which advance along the second and third portions of the path can move from a higher level to a lower level. Such advancing step preferably further comprises moving the blanks in a third direction substantially at right angles to at least one of the first and second directions in a fourth portion of the path between the first and second portions. Such process further comprises the step of holding the blanks against any, or at least against appreciable, changes of orientation during advancement along the predetermined path. In other words, if the axes of cylindrical blanks are substantially vertical during and upon completed admission into the path, such axes preferably remain vertical during travel along each and every portion of the path. The fourth portion of the path is or can be substantially horizontal. The insulating step includes thermally insulating the blanks in the fourth portion of the path from the surrounding atmosphere, and the step of establishing a layer of inert gas includes establishing such layer around the blanks in the fourth portion of the path.

The accumulating step can include admitting discrete blanks into a further portion of the path upstream of the first portion, and the process further comprises the step of removing successive blanks of the at least one column from an additional portion of the path downstream of the third portion. The admitting step preferably comprises moving the blanks in a further direction substantially at right angles to the direction of movement of blanks along the first portion of the path, and the removing step preferably comprises moving the blanks from the additional portion of the path in an additional direction substantially at right angles to the direction of movement of blanks along the second and/or third portion of the path. As mentioned above, the process preferably further comprises the step of holding the blanks against any, or at least against appreciable, changes of orientation in the course of each and every step including the blank admitting and blank removing steps.

The accumulating step can include accumulating carbon blanks into a plurality (e.g., three) first columns, and the preheating step then includes preheating the blanks of the plurality of first columns in discrete first portions of the path. Such process then preferably further comprises the step of gathering the blanks of the plurality of first columns into a single second column between the discrete first portions and the second portion of the path (particularly along the aforementioned fourth portion of the path).

The process preferably further comprises the steps of conveying the inert gas of the layer along the second portion of the path at a first speed, and conveying the inert gas of the layer along the first and third portions of the path at a second speed which is or can be substantially higher than the first speed. The advancing step of such process can include advancing the blanks along the second portion of the path from an upper level to a lower level, and the process can further comprise the step of at least substantially blocking upward flow of inert gas from the second portion of the path, particularly into the aforementioned fourth portion of the path.

The withdrawing step can include withdrawing metered quantities of inert gas from the third portion of the path at a plurality of discrete locations which are spaced apart from each other in the direction of advancement of blanks along the third portion of the path. Such process can also include the step of admitting metered quantities of inert gas into the third portion of the path at a plurality of discrete locations which are spaced apart from each other in the direction of advancement of blanks along the third portion of the path.

The improved process is or can be carried out by resorting to an apparatus which defines the predetermined path and comprises a plurality of components (such as electrodes, holding devices and others) which are heated during conversion of blanks into graphite electrodes. The process which is carried out in such apparatus preferably further comprises the steps of cooling the aforementioned components with inert gas including admitting cool inert gas into a second path wherein the components exchange heat with cool inert gas, and admitting the thus heated inert gas into at least one portion of the predetermined path. Such process preferably further comprises the step of withdrawing heat from inert gas prior to admission into the second path. Furthermore, such process can comprise the steps of discharging heated inert gas from the predetermined path and withdrawing heat from the discharged inert gas. The aforementioned admitting step can include admitting the thus cooled inert gas into the second path.

The aforementioned components of the apparatus can include a series of electrodes (e.g., a series of pairs of electrodes which are adjacent the second portion of the predetermined path. The step of cooling the components with cool inert gas preferably includes directing cool inert gas against the electrodes and thereupon into the second portion of the predetermined path. Such process can further include withdrawing metered quantities of inert gas at least from one end of the normally elongated second portion of the predetermined path. This withdrawing step can include causing inert gas to flow downwardly from the foremost electrode or electrodes and upwardly from the rearmost electrode or electrodes of the series of electrodes.

The process can further comprise the steps of withdrawing inert gas from one end of the normally elongated first portion of the predetermined path, and admitting the thus withdrawn inert gas into the other end of the first portion of the predetermined path.

Still further, the process can comprise the step of treating the blanks prior to the accumulating step. If the blanks of the at least one column are disposed end-to-end, the treating step preferably comprises flattening and/or smoothing the ends of the blanks.

The novel features which are considered as characteristic of the invention are set forth in particular in the appended claims. The improved process itself, however, together with additional features and advantages thereof, will be best understood upon perusal of the following detailed description of certain specific embodiments of an apparatus which can be used for the practice of the process and is shown in the accompanying drawing.

BRIEF DESCRIPTION OF THE DRAWING

FIG. 3 is an enlarged view of a detail in the apparatus of FIG. 1;

FIG. 4 is a horizontal sectional view as seen in the direction of arrows from the line IV—IV of FIG. 3.

DESCRIPTION OF PREFERRED EMBODIMENTS

Figure 1:
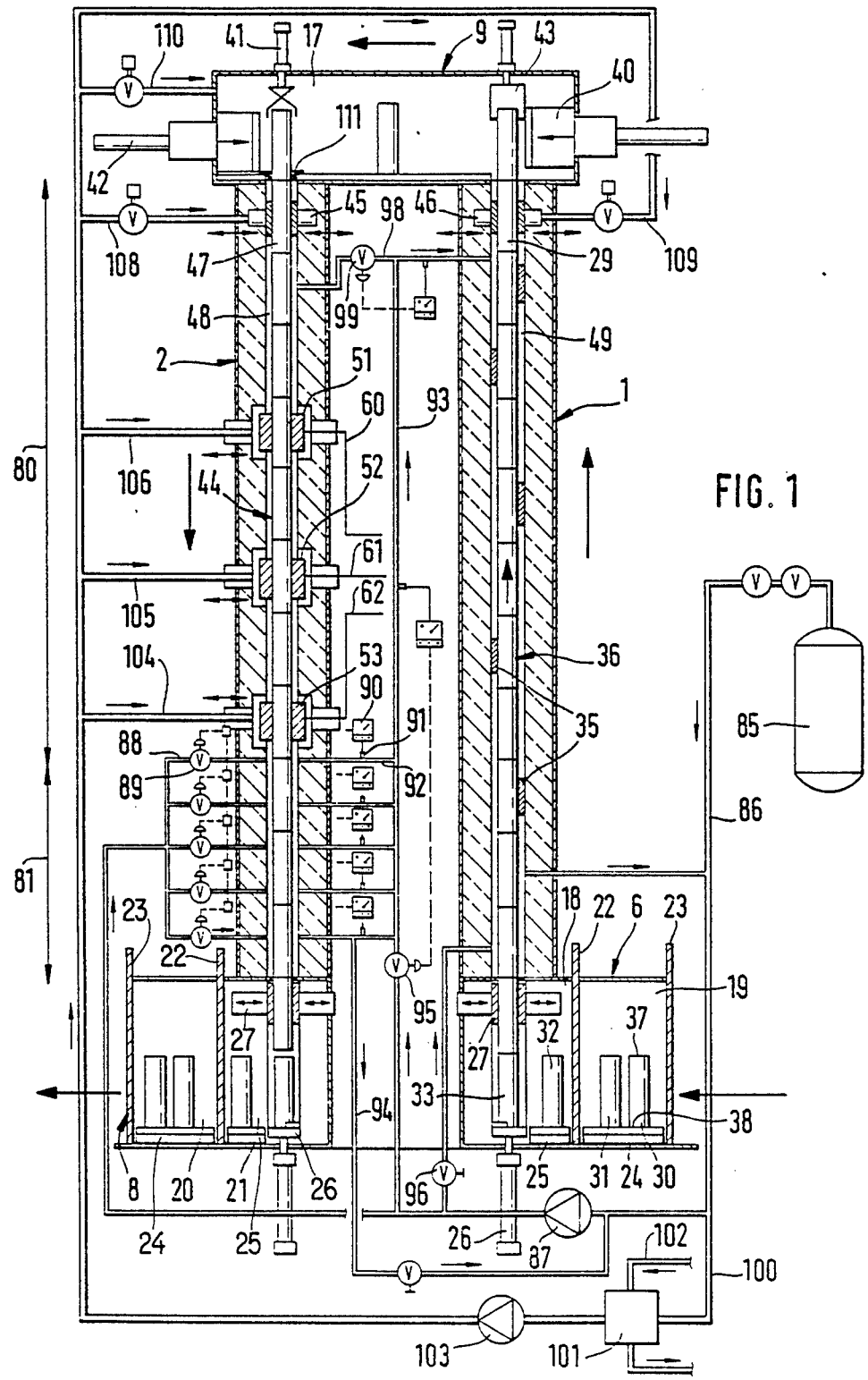
FIG. 1 is a schematic partly elevational and partly vertical sectional view of an apparatus which can be utilized for the practice of the improved process.
Figure 2:
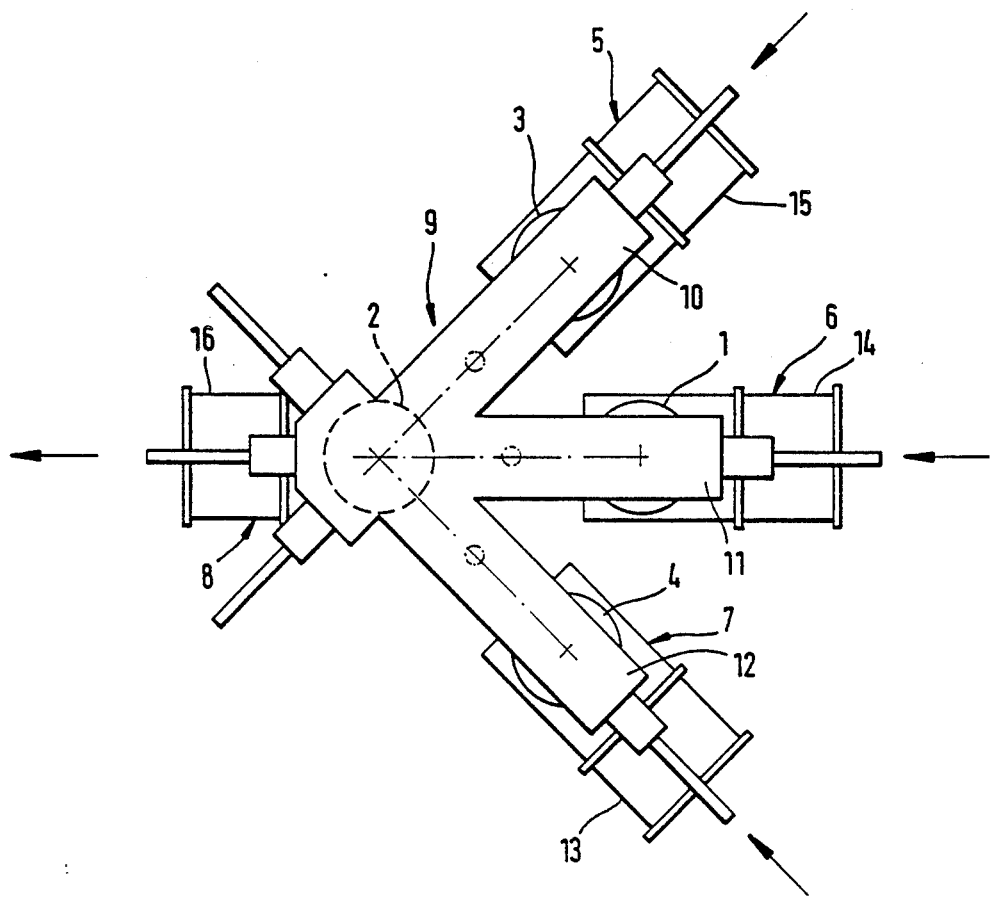
FIG. 2 is a plan view of a portion of the apparatus.

The apparatus which is shown in FIGS. 1 and 2 comprises four upright graphite tubes 1, 2, 3 and 4 each of which preferably has a cylindrical internal surface and a cylindrical external surface. These tubes are highly resistant to heat and serve as a means for thermally insulating certain portions of a predetermined path for carbon blanks from the surrounding atmosphere. The tubes 1, 3 and 4 define three discrete elongated first portions of the predetermined path wherein carbon blanks are caused to advance upwardly in stepwise manner, and the tube 2 defines the second (80) and third (81) portions of such path. The carbon blanks are caused to move downwardly (i.e., from a higher level to a lower level) during stepwise advancement along the second and third portions of the predetermined path. A three-pronged horizontal fourth portion of such path extends from the upper ends of the tubes 1, 3, 4 to the upper end of the tube 2. The tubes 1 to 4 are designed to fluidtightly seal the respective portions of the path for carbon blanks from the surrounding atmosphere. The axes of the tubes 1 to 4 are parallel (vertical), and the height of the tube 1 matches the height of the other three tubes.

The tubes 1 to 4 are respectively supported by or seated on so-called gate devices 6, 8, 5 and 7, respectively. The gate devices 6, 5, 7 serve for admission of fresh carbon blanks into the lower end portions of the respective tubes 1, 2, 3, and the gate device 8 serves for removal of successive graphite electrodes (converted carbon blanks) from the lower end of the tube 2.

The aforementioned fourth portion of the predetermined path is defined by a conveyor 9 which serves to transfer carbon blanks from the upper ends of the tubes 1 to 3 to the upper end of the tube 2. The three branches of the conveyor 9 are shown at 10, 11 and 12. The branch 11 serves for transfer of preheated blanks from the tube 1 to the tube 2; the branch 10 serves to transfer preheated blanks from the tube 3 to the tube 2; and the branch 12 serves to transfer preheated blanks from the tube 4 to the tube 2. The directions in which the branches 10 to 12 transfer preheated blanks to the tube 2 are indicated by arrows (see FIG. 2).

The gate devices 5 to 8 are respectively confined in closed casings 15, 14, 13 and 16. A further casing 17 is provided for the conveyor 9. Each of the five casings 13 to 17 serves as a means for thermally insulating the respective gate devices and the conveyor 9 from the surrounding atmosphere as well as to provide a fluid-tight enclosure for the blanks. The material of the casings 13 to 17 is highly resistant to heat.

Each gate device comprises a partition which divides its interior into two chambers. For example, the gate device 6 of FIG. 1 has a partition 22 which is disposed between two chambers 18, 19, and the gate device 8 of FIG. 1 has a similar partition 22 between two chambers 20, 21. The construction of the gate devices 5 and 7 is or can be identical to that of the gate device 6. The inner chamber 18 of the gate device 6 communicates with the lower (receiving) end of the internal space of the tube 1, and the inner chamber 21 of the gate device 8 communicates with the lower (discharge) end of the internal space of the tube 2. The inner chambers of the gate devices 5 and 7 communicate with the lower (receiving) ends of internal spaces of the corresponding tubes 3 and 4. The internal space of the casing 17 for the conveyor 9 communicates with the upper (discharge) ends of internal spaces of the tubes 1, 3, 4 and with the upper (receiving) end of internal space of the tube 2.

The gate device 6 beneath the tube 1 has two substantially vertically movable doors or gates 22, 23, two conveyors 24, 25, a so-called lifting punch 26, and a clamping element 27. The parts 22 to 27 are actuatable by fluid-operated (particularly hydraulic) motors some of which are shown in the drawing (see the punch 26 and the clamping element 27). The exact details of such parts are immaterial insofar as the understanding of the improved process is concerned. The door or gate 22 constitutes the aforementioned partition between the chambers 18, 19 of the gate device 6. The conveyor 24 in the chamber 18 supports two upright cylindrical carbon blanks 30, 31, and the conveyor 25 supports a cylindrical blank 32. A further blank 33 is supported by the platform of the vertically movable lifting punch 26. The blanks 30 to 33, as well as all other blanks which are manipulated in the apparatus of FIGS. 1 to 4, are dimensionally stable and preferably have identical sizes and shapes. For example, each carbon blank can be several meters long.

The internal surface of the tube 1 is lined with a helical strip-shaped member 35 which is made of graphite. This strip-shaped member directly surrounds the corresponding discrete first portion of the path wherein a column 36 of coaxial cylindrical carbon blanks is advanced stepwise from a lower level to a higher level. The length of stepwise advances of the column 36 is determined by the length of working strokes of the lifting punch 26. The clamping element 27 releases the carbon blank which was held by its jaws when the lifting punch 26 performs an upward stroke so that the blank which was held by the jaws of the clamping element 27 is pushed upwardly and enters the lower end of the internal space of the tube 1, and the jaws of the clamping element 27 then engage the blank 33 which rests on the raised platform of the punch 26. The latter then descends so that its platform can receive the blank 32 from the conveyor 25. The partition or door 22 is then lifted while the door 23 continues to seal the gate device 6 from the surrounding atmosphere, and the conveyor 24 transfers at least one blank onto the conveyor 25. The door 22 is then closed and the door 23 is lifted to permit delivery of one or more fresh blanks onto the conveyor 24 in the direction of arrow which is shown in FIG. 1. The same procedure is repeated again and again at necessary intervals to ensure that the length of the column 36 remains unchanged and that the blanks of this column advance upwardly in stepwise fashion in order to deliver the topmost preheated blank into the range of the conveyor 9 in the casing 17.

Each carbon blank is or can be treated prior to entering the gate device 5, 6 or 7. Such treatment preferably involves flattening or smoothing the two end faces of each blank so as to ensure that the blanks which form the columns in the tubes 1 to 4 will be disposed end-to-end and that their ends will lie flush against the ends of neighboring blanks. FIG. 1 shows that the blank 30 in the chamber 19 of the gate device 6 has two flat end faces 37 and 38 which are normal to the axis of the blank. Such treatment of blanks ensures that they can be stacked to form columns (such as the column 36 in the tube 1) of predictable height. Moreover, this facilitates the transport of blanks by the conveyors 24, 25 in the gate device 6 and by analogous conveyors in the other gate devices.

Each of the three branches 10–12 of the conveyor 9 has a so-called conveying punch 40, an adjusting member 41, an equalizer 42, and a gripper 43. The parts 40–43 in each of the branches 10–12 are actuated by suitable non-referenced motors (preferably fluid-operated and most preferably hydraulic motors) all details of which are not specifically shown in FIGS. 1 to 4. The topmost blank of the column 36 is shifted sideways (along the horizontal fourth portion of the predetermined path) by the conveying punch 40 so that it assumes a position in which it is coaxial with the topmost blank of the column 44 of coaxial blanks in the tube 2. The adjusting member 41 ensures that a freshly shifted blank is accurately aligned with the blanks in the tube 2. The gripper 43 can serve to hold the blank against tilting during shifting by the conveying punch 40, and the equalizer 42 can serve to return the gripper 43 to its starting position.

A fluid-operated (preferably hydraulically operated) device 46 is provided to temporarily hold the topmost blank (29) of the column 36 in the tube 1. A similar fluid-operated device 45 is provided to temporarily hold the topmost blank (47) of the column 44 in the tube 2. Analogous holding devices are associated with the tubes 3 and 4.

The column 44 is received in the tube 2 with an annular clearance 48. The annular clearance 49 between the internal surface of the tube 1 and the column 36 of blanks therein is actually a helix due to the provision of the strip-shaped member 35.

The gate device 8 beneath the tube 2 also comprises two doors or gates 22, 23 (the former of which constitutes the aforementioned partition between the chambers 20, 21), two conveyors 24, 25, a lowering punch 26 and a clamping element 27. The jaws of the clamping element 27 release the converted blank (graphite electrode) between them when the platform of the punch 26 is in raised position. As the punch 26 thereupon descends to deliver the electrode onto the conveyor 25, the lowermost converted blank of the column 44 descends between and is engaged by the jaws of the clamping element 27. The conveyors 25, 24 in the chambers 21 and 20 cooperate to remove successive graphite electrodes from the additional portion of the path beneath the third portion 80 (i.e., the lower portion of the internal space of the tube 2). The direction of removal of successive graphite electrodes from the gate device 8 is indicated by the arrow in the lower left-hand portion of FIG. 1. The column 44 is lowered in stepwise fashion through distances corresponding to the length of a blank or electrode. The arrangement is such that the orientation of the blanks remains unchanged during advancement along the further portions of the path ahead of the first portions which are defined by the tubes 1, 3 and 4), along the first portions of the path (in the tubes 1, 3 and 4), along the three branches of the fourth portion of the path (in the casing 17), along the second and third portions 80, 81 of the path (in the tube 2), and along the additional portion of the path (in the gate device 8).

The conveyor 9 can receive preheated blanks from the tubes 1, 3 and 4 in a selected sequence, e.g., one blank from the tube 3, thereupon one blank from the tube 1, thereupon one blank from the tube 4, one blank from the tube 3, and so forth. Alternatively, the conveyor 9 can receive two or more blanks from the tubes 3, 1, 2 in such order or in any other desired order. The advancement and treatment of blanks in the tube 1 is the same as in the tube 3 or 4. Irrespective of whether the conveyor 9 receives individual blanks or two or more blanks from the tubes 1, 3 and 4 in a selected sequence, the upper end of the tube 2 receives one blank at a time.

The upper part of the tube 2 contains three sets of electrodes 51, 52, 53 which are disposed at different levels (i.e., they are adjacent different portions of the second portion 80 of the path for the blanks. The blanks in such second portion 80 of the path are heated to an elevated temperature of 3000° C. (±180° C.), and the thus heated blanks are then cooled in the third portion 81 of the path. The second and third portions 80, 81 of the path are elongated and are denoted by two double-headed arrows and shown in the left-hand portion of FIG. 1.

The set 51 of electrodes is or can be identical with the sets 52 and 53 electrodes. Therefore, FIGS. 3 and 4 merely show the details of the electrode set 53. This set comprises two discrete graphite electrodes 54, 55 which are disposed diametrically opposite each other with reference to the axis of the tube 2 and, when operative, are immediately adjacent the peripheral surface of the blank (56) between them. The electrodes 54, 55 can be said to form a shell (see FIG. 4) which completely surrounds the respective part of the peripheral surface of the blank 56 when the blank 56 is being heated to graphitizing temperature. The means for connecting the electrodes 54, 55 of the set 53 to a source of electrical energy comprises conductor means 62 (FIG. 1 further shows conductor means 60 and 61 which connect the energy source with the electrodes of the other two sets 51 and 52, respectively). Fluid-operated (particularly hydraulic) motors 65 and 66 are provided to move the electrodes 54, 55 toward engagement with and away from the blank 56 (note the arrows 63 and 67). The electrodes 54, 55 are retracted by the respective motors 65, 66 when the column 44 of blanks in the tube 22 is about to descend by a step, i.e., when the clamping element 27 in the gate device 8 is deactivated and the raised platform of the lowering punch 26 in the gate device 8 is about to descend. The electrodes 54, 55 are moved into engagement with the next blank (the one above the blank 57 of FIG. 3) when the downward movement of the column 44 by a step is completed, and the thus moved electrodes 54, 55 are then connected with the energy source by conductor means 62 to heat the blank to requisite graphitizing temperature.

The electrodes 54, 55 have coaxial channels or breaks 68 which extend through them and communicate with the annular clearance 48. FIGS. 3 and 4 further show that the electrodes 54 and 55 are respectively installed in chambers 69 and 70 which receive a fluid coolant by way of conduits 72, 71, respectively. Coolant which enters the chambers 69, 70 passes through channels which are provided in the respective electrodes 54, 55 and thereupon flows into the annular clearance 48 which is adjacent the internal surface of the tube 2.

When the apparatus of FIGS. 1 to 4 is in use, the lower end of each of the tubes 1, 3, 4 receives fresh blanks by way of the respective gate devices 6, 5, 7 in a manner as described above in connection with the gate device 6. The column 36 in the tube 1 is moved upwardly in stepwise fashion at a frequency which is determined by the controls for the motor of the lifting punch 26 in the gate device 6. The same holds true for stepwise lifting of columns of coaxial blanks in the tubes 3 and 4. The conveyor 9 transfers the topmost preheated blanks from the tubes 1, 3, 4 to the upper end of the tube 2 by causing the preheated blanks to advance along a substantially horizontal (fourth) portion of the path for the blanks and graphite electrodes, and the column 44 is caused to descend stepwise in the tube 2 at a frequency which is higher than the frequency of stepwise upward movement of columns in the tubes 1, 3 and 4. The blanks are preheated in the tubes 1, 3 and 4, the blanks are heated to maximum temperature in the second section 80, and they are cooled in the third portion 81 of their path.

The casings 13 to 17 and the annular clearances 48, 49 are filled with an inert gas, preferably pure argon. Such inert gas is circulated along the path for the blanks and graphite electrodes as well as by flowing through a plurality of conduits in a manner to be described hereinafter. The arrangement is or can be such that inert gas flows from the annular clearance 48 into the annular clearance 49. The temperature of such gas is high because it has exchanged heat with blanks and with graphite electrodes in the tube 2 prior to being admitted into the annular clearance 49. The inert gas can be said to form an annular layer which surrounds the blanks and graphite electrodes in the tubes 1 to 4 and the blanks in the casing 17. Preheating of blanks in the tubes 1, 3 and 4 takes place as a result of exchange of heat with inert gas which flows from the clearance 48 into the clearance 49. Heating of preheated blanks in the path portion 80 takes place as a result of contact with the sets 51, 52, 53 of electrodes, and the thus heated (graphitized) blanks are thereupon cooled in an accurately controlled manner during stepwise downward movement along the third path portion 81. Cooling is effected by causing the graphitized blanks to exchange heat with cool or relatively cool inert gas which is admitted into the third portion 81 of the path.

Figure 5:
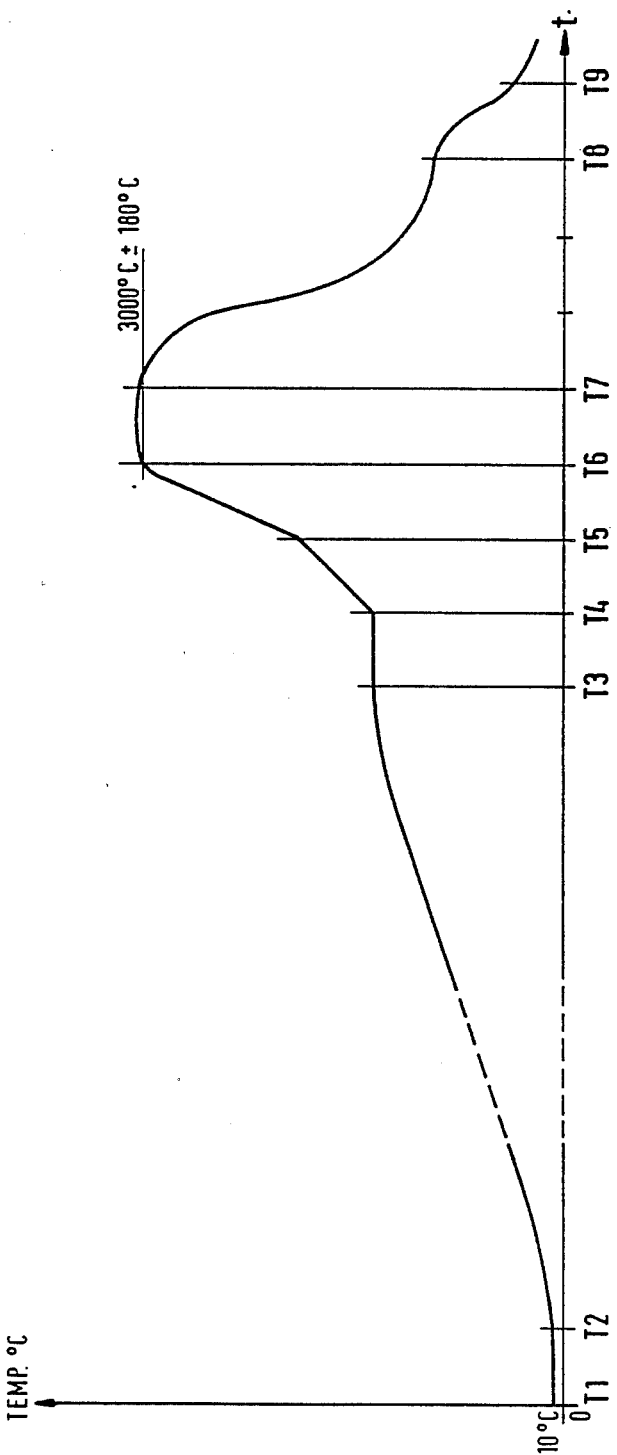
FIG. 5 is a diagram wherein the curve indicates the temperatures of carbon blanks during different stages of conversion into graphite electrodes.

The curve of the diagram which is shown in FIG. 5 denotes the temperature of a blank during advancement along its path from one of the gate devices 5 to 7 (for example, from the gate device 6 beneath the tube 1) to the gate device 8 beneath the tube 2. The temperature is measured along the ordinate and the time is measured along the abscissa. T1 denotes the temperature of a blank (e.g., 33) in the gate device 6, and T2 denotes the temperature of such blank on entry into the lower end portion of the internal space of the tube 1. The temperature of such blank rises to T3 when the blank leaves the upper end of the tube 1. The temperature assumes the value T4 on entry of the blank into the upper end of the tube 2, and such temperature then rises to T5 as a result of heating of the blank by the electrodes of the set 51. The temperature rises to T6 as a result of heating by the electrodes of the set 52, and to T7 as a result of heating by the electrodes 54, 55 of the set 53. The temperature thereupon decreases to T8 when the graphitized blank (graphite electrode) enters the gate device 8, and such temperature drops to T9 at the locus of removal of the electrode from the gate device 8.

Preheating of a blanks takes up a relatively long interval of time (between T2 and T3), namely substantially three times the interval which elapses between T4 and T8. This is indicated by dotted-line breaks (between T2 and T3) in the curve and in the abscissa of FIG. 5. Pronounced heating of blanks takes place between T4 and T7. The maximum (graphitizing) temperature (between T6 and T7) is normally approximately 3000° C. (±180° C.). The relatively long cooling phase between T7 and T8 is followed by a shorter secondary cooling phase between T8 and T9. Additional cooling takes place as a result of exchange of heat with atmospheric air upon removal of a graphite electrode from the gate device 8.

EXAMPLE

The conversion of a carbon blank into a graphite electrode can be carried out in the following way: The interval of preheating a blank (such as 33) in the respective gate device (6) can take between 5 and 30 hours (preferably approximately 10 hours). The interval of preheating of the blank (33) in the respective tube (1) takes up between 40 and 240 hours (preferably approximately 80 hours), and the period of dwell in the casing 17 can be between 5 and 30 hours (preferably approximately 10 hours). The interval of stepwise transport from the casing 17 into the range of the electrode set 51 and heating by this set can take between 5 and 30 hours (preferably about 10 hours), and the same holds true for the interval between T5 and T6 as well as for the interval between T6 and T7. The interval of cooling from T7 to T8 can take between 10 and 90 hours (preferably about 30 hours), and the interval of cooling from T8 to T9 can take between 5 and 30 hours (preferably about 10 hours). The temperature T1 is between 10° and 60° C. (preferably about 20° C.); the temperature T2 is between 10° and 60° C. (preferably about 20° C.); the temperature T3 is between 1000° and 2000° C. (preferably about 1500° C.); the temperature T4 is between 1000° and 2000° C. (preferably about 1500° C.); the temperature T5 is between 1500° and 2500° C. (preferably about 2000° C.); the temperature T6 is between (2820° and 3180° C. (preferably about 3000° C.); the temperature T7 is between 2820° and 3180° C. (preferably about 3000° C.); the temperature T8 is between 800° and 1200° C. (preferably about 1000° C.), and the temperature T9 is between 300° and 600° C. (preferably about 500° C.). Highly satisfactory results were achieved with temperatures T1 to T9 which are shown in parentheses; however, each of these temperatures can be varied within the respective range.

Referring again to FIG. 1, the character 85 denotes a source (e.g., a reservoir) of inert gas (preferably pure argon) which can be supplied to a plurality of different locations in the predetermined path wherein carbon blanks advance from the gate devices 5, 6, 7 to the gate device 8. FIG. 1 further shows a conduit 86 which serves to convey insert gas to a blower 87. The latter supplies inert gas to five conduits 88 which, in turn, admit inert gas to five spaced apart locations of the third portion 81 of the path (cooling zone). The five locations are spaced apart from each other in the direction of advancement of blanks in the tube 2. The conduits 88 admit cool inert gas into the respective portions of the annular clearance 48, and each of these conduits contains a regulating valve 89 which can be manipulated by hand or by a controller 90 to admit accurately metered quantities of inert gas. Each valve 89 can interrupt the flow of inert gas from the respective conduit 88 into the annular clearance 48. The controllers 90 for the regulating valves 89 receive signals from discrete thermosensors 91 which are mounted in discrete gas withdrawing conduits 92 having intake ends communicating with the annular clearance 48 at five spaced-apart locations of the path portion 81 (as seen in the direction of stepwise (downward) advancement of blanks and converted blanks in the tube 2).

The withdrawing conduits 92 admit inert gas into a conduit 93 which can admit inert gas into the upper portion of the annular clearance 49 (and into the upper portions of corresponding clearances in the tubes 3 and 4). Alternatively, or in addition to admission of inert gas into the conduit 93, the conduits 92 can admit withdrawn inert gas into a conduit 94 which supplies inert gas to the intake of the blower 87 for admission into the lower end of the annular clearance 49 in the tube 1 (and into the lower ends of the tubes 3 and 4). The flow of inert gas in the conduit 94 can be regulated by a valve 95, and the flow of inert gas from the blower 87 to the lower end of the annular clearance 49 can be regulated by a valve 96.

A further conduit 98 connects the upper end of the annular clearance 48 with the upper end of the annular clearance 49 to admit heated inert gas from the tube 2 directly into the tube 1. The rate of flow of inert gas from the tube 2 into the tube 1 via conduit 98 is regulated by an adjustable valve 99. Similar conduits are provided to connect the upper end of the tube 2 with the upper ends of the tubes 3 and 4. The manner of circulating inert gas in the tubes 3 and 4 is or can be identical with the aforedescribed mode of circulating inert gas in the annular clearance 49 within the tube 1.

The circulation of inert gas is preferably regulated with a very high degree of precision, particularly as concerns the admission of inert gas into and its withdrawal from the third portion 81 of the path (main cooling zone). In other words, the rate at which the temperature of graphitized blanks drops from T7 to T8 is or should be controlled with a very high degree of precision.

The conduits 93 and 94 are designed in such a way that they can constitute a bypass for admission of cold inert gas into the annular clearance 49 in the tube 1. This is desirable in order to avoid overheating of blanks in the tube 1, i.e., when the temperature T3 exceeds the range which is recited in the Example.

The apparatus of FIGS. 1 to 4 further defines a second path for the flow of cold inert gas into heat exchanging contact with various components of the apparatus which are heated as a result of conversion of carbon blanks into graphite electrodes. The arrangement is such that inert gas which is used to heat these components (including the electrode sets 51, 52, 53) is thereupon admitted into one or more selected portions of the (predetermined) path for advancement of carbon blanks from the gate devices 5-7 to the gate device 8. The second path receives inert gas from a conduit 100 which can receive inert gas from the source 85 (via conduit 86) and/or from the annular clearance 49 and extends through a heat exchanger 101 where the inert gas exchanges heat with a heat exchange fluid in a conduit 102. The thus cooled inert gas flows from the heat exchanger 101 to the intake of a blower 103 which can raise the pressure of inert gas to a value well above that at the outlet of the blower 87. The conduits (including the conduit 100) which define the second path (for conveying cooled inert gas into heat exchanging contact with various heated components of the apparatus) are shown in FIG. 1 by heavier lines and include the conduits 104, 105, 106 which respectively convey cooled inert gas to the electrodes of the sets 53, 52 and 51. A conduit 108 supplies cool inert gas to the chamber for the holding device 45 in the upper part of the tube 2, and a further conduit 109 delivers cool inert gas to the chamber for the holding device 46 in the upper part of the tube 1. A conduit 110 is provided to deliver cool inert gas to the conveying punches 40, adjusting members 41, equalizers 42 and grippers 43 of the conveyor 9. Once the inert gas exchanges heat with the components which receive cool inert gas via conduits 104-106 and 108-110, it is admitted into the annular clearance 48 and/or 49 be admixed to inert gas which is supplied to the internal spaces of the tubes 1 to 4 by the blower 87.

The speed of inert gas which flows in the second portion 80 of the path (in the upper part of the annular clearance 48 within the tube 2) is relatively low in order to ensure that the inert gas dissipates as little heat as possible. This is accomplished by the provision of a blocking device or seal 111 (preferably a labyrinth type seal) at the upper end of the annular clearance 48 to throttle or prevent the flow of hot inert gas from the upper end of the tube 2 into the casing 17.

The second path portion 80 accumulates a surplus of inert gas because it receives cool inert gas from the conduits 104, 105, 106 and 108 (subsequent to heating of such gas by the electrode sets 53, 52 and 51 and holding device 45). The surplus is admitted into the upper part of the annular clearance 49 via conduit 98 and/or is evacuated from the third path portion 81 by way of one or more conduits 92. The rate of evacuation of inert gas from the path portions 80 and 81 is regulated in such a way that excess inert gas flows downwardly from the lowermost electrode set 53 and/or upwardly from the uppermost electrode set 51. The downwardly flowing inert gas is evacuated by way of one or more conduits 92, and the upwardly flowing inert gas is evacuated by way of the conduit 98.

The layer of inert gas in the annular clearance 49 within the tube 1 (and in the tubes 3 and 4) can flow upwardly or downwardly. The strip-like member 35 compels such inert gas to flow along a helical path irrespective of whether the gas flows from the lower end toward the upper end of the tube 1, 3 or 4 or in the opposite direction.

It is preferred to operate the apparatus in such a way that losses of inert gas are negligible or nil. Escaping inert gas is replaced with inert gas from the source 85.

The purpose of inert gas in the tubes 1-4 and casing 17 is to prevent undesirable reactions at the surfaces of carbon blanks in the course of the graphitizing operation. An advantage of an inert gas over carbon black particles (which are intended to serve a similar purpose) is that the operation is simpler and the apparatus remains clean if the reactions at the surfaces of carbon blanks are prevented by an inert gas. Moreover, and as fully described above, it is simple to recover substantial amounts of heat from the layers of inert gas and to use such heat in the tubes 1, 3 and 4 to preheat the blanks on their way toward the casing 17.

The apparatus which is shown in FIGS. 1 to 4 can be modified in a number of ways. For example, the tubes 1 to 4 can be horizontal or their axes can be inclined to the horizontal and to the vertical. If the tubes are horizontal or nearly horizontal so that the blanks which form the columns therein do not abut each other under the action of gravity, the apparatus comprises means for pressing neighboring blanks in each of the tubes against each other. An advantage of an apparatus with upright (vertical or substantially vertical) tubes is that there is no need for the provision of special devices which would ensure that the blanks which form the columns in upright tubes will invariably engage each other end-to-end. Therefore, the carrying out of the process in an apparatus employing upright tubes is preferred at this time.

It is further within the purview of the invention to provide the apparatus with a single upright tube wherein the heating and cooling zones are located at levels above the preheating zone. This renders it possible to dispense with the conveyor 9 and casing 17. However, this also results in a substantial increase of overall height of the apparatus. The length of the tube 2 can but need not match the length of the tube 1, 3 and/or 4. Furthermore, while the illustrated apparatus is operated in such a way that the blanks move upwardly in the tubes 1, 3 and 4 and downwardly in the tube 2, it is possible to modify the apparatus so that the blanks descend in the tubes 1, 3, 4, that the conveyor 9 operates between the lower ends of the tubes 1, 3, 4 and the lower end of the tube 2, and that the means for advancing the blanks in such modified apparatus comprises means for moving the blanks upwardly in the tube 2. Still further, the apparatus can comprise one or more first tubes (such as 1, 3 and 4) wherein the blanks are moved upwardly, an additional tube (corresponding to the tube 2) wherein the blanks are moved downwardly, and a further tube wherein the blanks are moved downwardly and are cooled during downward transport. Such apparatus then further comprises a second conveyor 9 or an analogous conveyor between the lower end of the additional (heating) tube and the lower end of the further (cooling) tube.

An advantage of the illustrated apparatus and process is that, since the blanks in the path portion 80 move downwardly, heated inert gas rises in the annular clearance 48 due to convection and can be readily stored for withdrawal of heat, particularly for preheating of blanks in the tube 1, 3 and/or 4.

Some of the blanks which reach the upper ends of the respective tubes 1, 3, 4 must be left in the region of the conveyor 9 for certain periods of time before they can be admitted into the upper end of the tube 2. This is the reason for the provision of insulating casing 17 which prevents excessive (or any) cooling of preheated blanks above the tubes 1 to 4. The temperature of inert gas in the casing 17 is selected with a view to ensure that the temperature (T3) of preheated blanks which are supplied by the tubes 1, 3 and 4 remains above a minimum acceptable value (reference may be had to the Example).

Closing of the circuit or circuits for inert gas is preferred in order to avoid unnecessary losses of inert gas and heat, especially if the inert gas is pure argon which is rather expensive. It is to be noted that argon is but one of several inert gases which can be used in the apparatus of FIGS. 1 to 4 or in analogous apparatus for the practice of the improved process. Certain types of inert gases must be confined in one or more closed paths on the ground that they could adversely affect the environment if permitted to leak into the surrounding atmosphere. Admission of discrete carbon blanks (one at a time) into the lower ends of internal spaces of the tubes 1, 3, 4 and evacuation of discrete graphite electrodes from the lower end of the tube 2 contributes to confinement of a very high percentage of inert gas in the apparatus.

As a rule, the advancement of a carbon blank from the lower end of the tube 1, 3 or 4 into the casing 17 takes much longer than the advancement of a carbon blank from the casing 17 into the gate device 8. This is due to the fact that gradual preheating with economical recovery of heat from inert gas is a rather slow procedure, especially when compared with heating by the electrode sets 51, 52 and 53. This is the reason that the apparatus preferably comprises a plurality of tubes (1, 3, 4) for the preheating of carbon blanks and a lesser number of tubes (e.g., one) for heating to graphitizing temperature and subsequent cooling. The three preheating units (including the tubes 1, 3 and 4) of the illustrated apparatus operate in parallel. It has been found that the height of the apparatus is not excessive and that the waiting time for preheated blanks in the casing 17 is not excessive if the number of first path portions (preheating zones) is three times the number of second (80) or third (81) path portions.

An advantage of the blocking means (seal 111) at the upper end of the tube 2 is that this blocking means prevents rapid circulation of inert gas in the path section 80 (heating to graphitizing temperature) because excessive agitation of inert gas in the upper portion of the annular clearance 48 could prolong the intervals which are needed to heat successive preheated blanks to a temperature of approximately 3000° C.

As concerns the rate of cooling graphitized blanks in the path portion 81, the exact shape of the corresponding part of the temperature curve (between T7 and T9 in FIG. 5) will depend upon a plurality of variables. Therefore, some experimentation might be necessary in order to ensure that the cooling operation is completed as rapidly as possible and that the ultimate products (graphite electrodes leaving the gate device 8) exhibit the desired characteristics. The provision of a plurality of conduits (88 and 92) for admission of metered quantities of cool inert gas into and for evacuation of metered quantities of heated inert gas from the path portion 81 ensures that the cooling action can be regulated with a very high degree of precision. The number of conduits 88 and 92 can be increased to six or more if it is desired to regulate the cooling of graphitized carbon blanks with an even higher degree of accuracy.

The blower 103 for admission of cooled inert gas into the conduits 104–106 and 108–110 can receive a mixture of inert gas, partly from the source 85 and partly from the lower portion of the annular clearance 49 in the tube 1 and from corresponding annular clearances in the tubes 3 and 4. The pressure of cooled inert gas which leaves the blower 103 suffices to ensure intensive cooling of those components which receive inert gas from the conduits 104–106 and 108–110 to thus guarantee that all components which require cooling will not be overheated when the apparatus is in use. Recovery of heat from inert gas which is admitted from the conduits 104–106 and 108–110 into the annular clearances 48, 49 and into the casing 17 contributes to the economy of operation. An additional advantage of cooling certain components of the apparatus in the aforedescribed manner (by delivery cool inert gas via conduits 104–106 and 108–110 and by thereupon admitting heated inert gas into the annular clearance 48, 49 and into the casing 17) is that it is not necessary to provide additional conduits for recovery and removal of heated inert gas which has been supplied by the blower 103. Thus, inert gas which has been delivered by the conduits 104–106 and 108–110 and has entered the path for the carbon blanks is circulated in the same way as inert gas which is supplied by the blower 87.

The reason for preliminary treatment of blanks ahead of the gate devices 5 to 7 is that the end faces (37, 38) of certain freshly delivered carbon blanks are likely to exhibit uneven portions and/or protuberances. Protuberances at the end faces of the blanks can affect the stability of columns in the tubes 1 to 4. The implements or machines which are used to smooth the end faces 37, 38, especially to remove protuberances (if any), are of conventional design and are not shown in the drawing. The preliminary treatment can be carried out while the blanks are maintained in horizontal positions so that each of their end faces is accessible to material removing tools.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A process for converting substantially identical dimensionally stable carbon blanks into graphite electrodes, comprising the steps of accumulating the blanks into at least one column wherein the blanks are disposed on top of each other; thermally insulating the blanks of the at least one column from the surrounding atmosphere; advancing the at least one column along a predetermined path; preheating the blanks in a first portion of said path; directly heating the preheated blanks with electric current in a second portion of the path downstream of the first portion to graphitize the blanks; cooling the blanks in a third portion of said path downstream of the second portion; establishing a layer of inert gas around the column of blanks in said path; withdrawing inert gas from the third portion of the path; and returning the withdrawn gas into the first portion of the path.

2. The process of claim 1, wherein the inert gas is argon.

3. The process of claim 1 for converting cylindrical carbon blanks, wherein said accumulating step includes placing the blanks end-to-end so that the at least one column contains coaxial blanks.

4. The process of claim 1, further comprising the steps of conveying the returned gas along the first portion of the path, and admitting the thus conveyed gas into the third portion of the path.

5. The process of claim 1, wherein the accumulating step includes gathering carbon blanks into at least one substantially upright column.

6. The process of claim 1, wherein said advancing step includes advancing the blanks in a first direction along the first portion of said path and in a different second direction along the second and third portions of the path.

7. The process of claim 6, wherein said second direction is substantially counter to said first direction.

8. The process of claim 6, wherein the blanks advancing in said first direction move from a lower level to a higher level and the blanks advancing in said second direction move from a higher level to a lower level.

9. The process of claim 6, wherein said advancing step further comprises moving the blanks in a third direction substantially at right angles to at least one of the first and second directions in a fourth portion of the path between the first and second portions.

10. The process of claim 9, further comprising the step of holding the blanks against appreciable changes of orientation during advancement along said path.

11. The process of claim 10, wherein the fourth portion of said path is substantially horizontal.

12. The process of claim 11, wherein said insulating step includes thermally insulating the blanks in the fourth portion of said path from the surrounding atmosphere and said step of establishing a layer of inert gas includes establishing such layer around the blanks in the fourth portion of said path.

13. The process of claim 1, wherein said accumulating step includes admitting discrete blanks into a further portion of said path upstream of the first portion, and further comprising the step of removing successive blanks of the at least one column from an additional portion of the path downstream of the third portion.

14. The process of claim 13, wherein said advancing step includes moving the blanks in a first direction along the first portion and in a second direction along the third portion of said path, said admitting step including moving the blanks in a further direction substantially at right angles to said first direction and said removing step including moving the blanks from the additional portion of the path in an additional direction substantially at right angles to said second direction.

15. The process of claim 14, further comprising the step of holding the blanks against appreciable changes of orientation in said path as well as in the course of said admitting and removing steps.

16. The process of claim 1, wherein said accumulating step includes accumulating blanks into a plurality of first columns and said preheating step includes preheating the blanks of said plurality of first columns in discrete first portions of said path, and further comprising the step of gathering the blanks of said plurality of first columns into a single second column between said discrete first portions and said second portion of said path.

17. The process of claim 16, wherein the accumulating step includes accumulating blanks into three first columns.

18. The process of claim 1, further comprising the steps of conveying the inert gas of said layer along the second portion of said path at a first speed, and conveying the inert gas of said layer along the first and third portions of said path at a second speed which is substantially higher than said first speed.

19. The process of claim 18, wherein said advancing step includes advancing the blanks along the second portion of said path from an upper level to a lower level, and further comprising the step of at least substantially blocking upward flow of inert gas from the second portion of said path.

20. The process of claim 1, wherein said withdrawing step includes withdrawing metered quantities of inert gas from the third portion of said path at a plurality of discrete locations which are spaced apart from each other in the direction of advancement of blanks along said third portion.

21. The process of claim 1, further comprising the step of admitting metered quantities of inert gas into the third portion of said path at a plurality of discrete locations which are spaced apart from each other in the direction of advancement of blanks along said third portion.

22. The process of claim 1 of converting carbon blanks in an apparatus which defines said path and comprises a plurality of components which are heated during conversion of blanks into electrodes, further comprising the steps of cooling the components with inert gas including admitting cool inert gas into a second path wherein the components exchange heat with cool inert gas, and admitting the thus heated inert gas from the second path into said predetermined path.

23. The process of claim 22, further comprising the step of withdrawing heat from inert gas prior to admission into said second path.

24. The process of claim 22, further comprising the steps of discharging heated inert gas from said predetermined path and withdrawing heat from the discharged gas, said admitting step including admitting the thus cooled gas into said second path.

25. The process of claim 22 of converting carbon blanks in an apparatus wherein the components include a series of electrodes adjacent the second portion of said predetermined path, wherein said step of cooling the components includes directing cool inert gas against the electrodes and thereupon into the second portion of said predetermined path, and further comprising the step of withdrawing metered quantities of inert gas at least from one end of the second portion of the predetermined path.

26. The process of claim 25, wherein said step of withdrawing inert gas from the second portion of said predetermined path includes causing inert gas to flow downwardly from the foremost electrode and upwardly from the rearmost electrode of the series.

27. The process of claim 1, further comprising the steps of withdrawing inert gas from one end of the first portion of said path and admitting the thus withdrawn gas into the other end of said first portion.

28. The process of claim 1, further comprising the step of treating the blanks prior to said accumulating step.

29. The process of claim 28, wherein said accumulating step includes placing the blanks end-to-end and said treating step includes flattening the ends of the blanks.

* * * * *